(12) United States Patent
Awano et al.

(10) Patent No.: US 6,674,693 B1
(45) Date of Patent: Jan. 6, 2004

(54) RECORDING METHOD, REPRODUCING METHOD AND RECORDING AND REPRODUCING APPARATUS FOR MAGNETO-OPTICAL RECORDING MEDIUM

(75) Inventors: Hiroyuki Awano, Noda (JP); Yuji Yamazaki, Toride (JP); Masaki Sekine, Kitasouma-gun (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/506,257

(22) Filed: Feb. 17, 2000

(30) Foreign Application Priority Data

Feb. 18, 1999 (JP) .......................................... 11-040697

(51) Int. Cl.$^7$ ............................................. G11B 11/00
(52) U.S. Cl. .................................. 369/13.14; 369/13.24
(58) Field of Search ........................ 369/13.14, 13.23, 369/13.24, 13.17, 44.24, 126, 44.16, 44.11, 13.28, 13.13, 112.26, 275.5, 53.25, 112.24, 13.32

(56) References Cited

U.S. PATENT DOCUMENTS 6,205,092 B1 * 3/2001 Yamaguchi et al. ..... 369/13.14
6,324,141 B2 * 11/2001 Takishima et al. ....... 369/53.25
6,404,705 B1 * 6/2002 Watanabe et al. ........ 369/13.14
6,477,118 B1 * 11/2002 Awano et al. ............ 369/13.14

FOREIGN PATENT DOCUMENTS

WO          WO 98/02878          1/1998

* cited by examiner

Primary Examiner—Ali Neyzari
(74) Attorney, Agent, or Firm—Oliff & Berridge, PLC

(57) ABSTRACT

While a magneto-optical recording medium is irradiated with a laser beam, the medium is rotated relative to the beam at a controlled speed in such a manner that a high temperature region of a heat spot produced on the basis of the light intensity distribution of the beam is formed outside the associated light spot. A magnetic field source includes a magnetic field generator which is narrow in the direction along the track of the medium. The field source is positioned with the field generator at the heat center outside the light spot to apply a narrow recording magnetic field to the high temperature region. This forms a recording magnetic domain in the high temperature region. The magnetic domain is rectangular and narrow in the direction along the track. Rectangular recording magnetic domains adjoining in the direction along the track hardly interfere with each other even if they are closely spaced. This results in high density recording.

26 Claims, 18 Drawing Sheets

Fig. 6
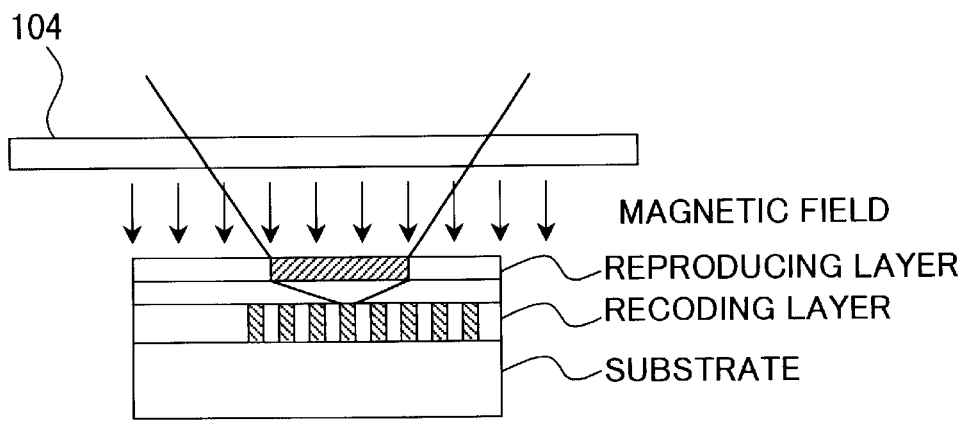
PRIOR ART
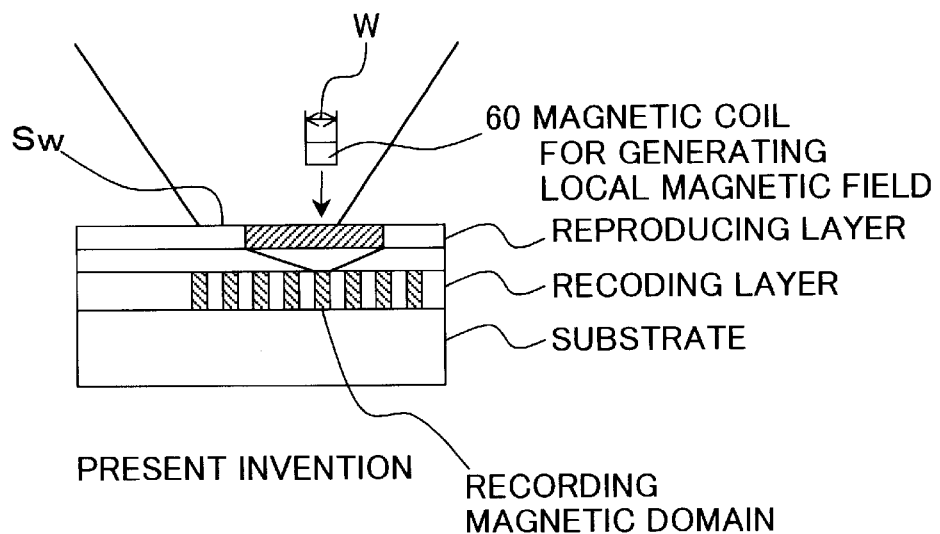
PRESENT INVENTION

Fig. 12
(A)
SUBSTRATE
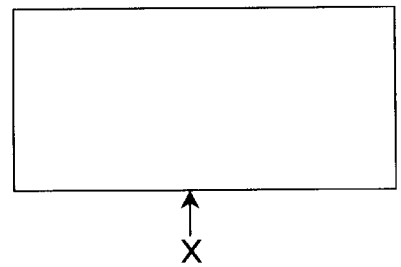
↑ X
(B)
COPPER FILM
SUBSTRATE
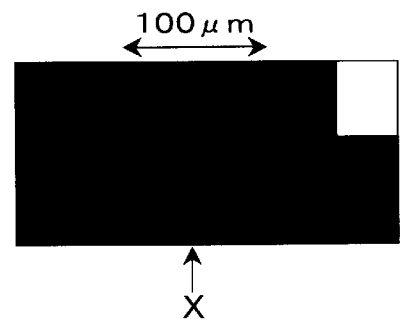
100 μm
↑ X
(C)
COPPER FILM    DIELECTRIC FILM
SUBSTRATE
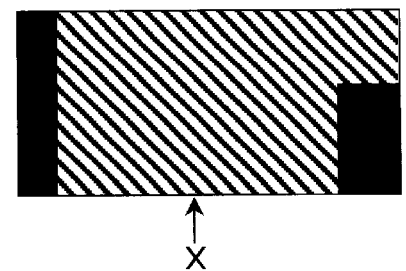
↑ X
(D)
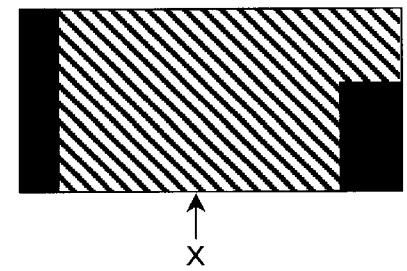
↑ X Fig. 13
(E)
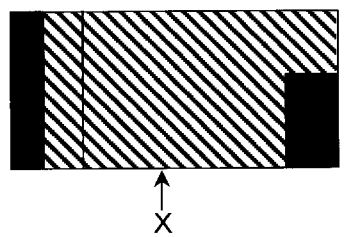
↑
X
(F)
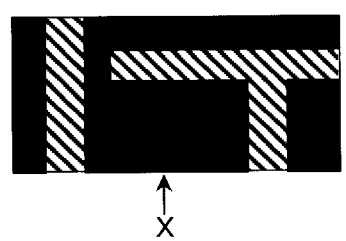
↑
X
(G)
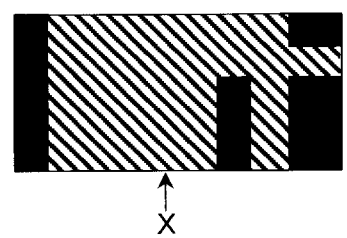
↑
X
(H)
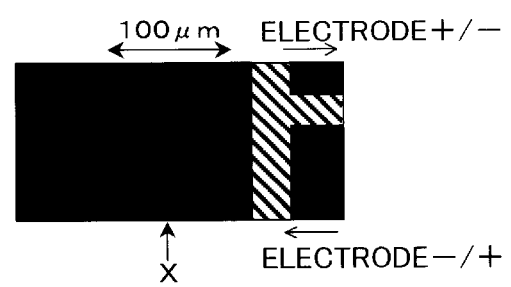
↑
X

RECORDING METHOD, REPRODUCING METHOD AND RECORDING AND REPRODUCING APPARATUS FOR MAGNETO-OPTICAL RECORDING MEDIUM

BACKGROUND OF THE INVENTION

1. Field of the Invention

The present invention relates to a recording/reproducing method, a recording/reproducing apparatus and a magneto-optical head for magneto-optical recording media. More specifically, the invention relates to a recording/reproducing method, a magneto-optical recorder and a magneto-optical head which are suitable for extra-high-density recording.

2. Description of Related Art

Recording media such as magneto-optical recording media are known as external memories for computers etc. The magneto-optical recording media can take or cover a great quantity of data such as dynamic images and voice, and are therefore used frequently as recording media in this multimedia era. It is desired that the storage capacity of magneto-optical recording media is increased.

A known method for increasing the storage capacity of a magneto-optical recording medium involves forming recording magnetic domains densely in the recording layer of the medium with a light spot having a minimized or minute diameter. For optical recording, the diameter of the light spot formed by a laser beam is represented by $\lambda/NA$ where $\lambda$ is the wavelength of the beam, and NA is the numerical aperture of the objective lens condensing the beam. It is therefore possible to minimize the light spot by either shortening the wavelength of the laser beam or increasing the numerical aperture of the objective lens. This makes it possible to form minute recording magnetic domains in the recording layer. However, if a plurality of minute recording magnetic domains exist in a reproducing light spot, there is need for a method for discriminating them and reproducing information from them.

As a method for reproducing information individually from the minute recording magnetic domains existing in a reproducing light spot, a technique for enlarging a magnetic domain and reproducing information from it as disclosed in WO98/02878 is proposed. A magneto-optical recording medium according to this technique includes a recording layer and a magnetically soft reproducing layer. It is possible to reproduce information from the recording medium by magnetically transferring the recording magnetic domains in the recording layer to the reproducing layer, and enlarging the transferred domains in the reproducing layer. This makes it possible to detect the minute recording magnetic domains inside a reproducing light spot individually as amplified signals from the reproducing layer.

It is possible to record information on a magneto-optical recording medium by irradiating the medium with a laser beam to form a heat spot based on the light intensity distribution in the light spot, then decreasing the coercive force in a high temperature region of the heat spot, and subsequently applying a recording magnetic field uniformly to the heat spot region including the high temperature region to reverse the magnetization of the high temperature region, where the coercive force has decreased, to form recording magnetic domains. In general, a magnetic coil is used to apply a magnetic field to a magneto-optical recording medium. In general, a magnetic coil is positioned on that side of a magneto-optical recording medium which is opposite to the substrate of the medium, that is to say, on the side of the medium where a recording film is formed. In general, a lens for condensing a laser beam is positioned on the side of the recording medium where the substrate lies.

If a high NA objective lens is used to minimize the light spot formed on a magneto-optical recording medium, it is necessary to shorten the distance between the lens and the adjacent surface of the recording medium because the focal distance of the lens is short. Therefore, as is the case with the magnetic coil, the high NA objective lens is positioned on the side of the recording medium where a recording film lies. The magnetic coil is constructed in such a manner that it does not intercept the light beam outgoing from the objective lens. For example, a solid immersion lens (SIL) may be used as a high NA lens. In this case, as shown in FIG. 16, a coil is wound around a SIL 10 to form a magnetic coil 104. The magnetic coil 104 can apply a magnetic field to the whole area of a light spot on a magneto-optical recording medium. The size of the recording magnetic domains formed in the recording layer of the recording medium depends on the size of the high temperature region of the heat spot. Therefore, in order to form minute recording magnetic domains, it has been necessary to minimize the heat spot. However, it has been difficult to control the size of the high temperature region of the heat spot because the size varies with the light intensity, the materials of the recording medium, etc. Consequently, it has not been easy to form smaller recording magnetic domains than the heat spot. The shape of the heat spot is reflected as the shape of recording magnetic domains. Accordingly, if the magnetic domains are overwritten, they take the form of feathers of an arrow, which is not necessarily desirable as the shape of magnetic domains for high density recording.

SUMMARY OF THE INVENTION

In view of the foregoing points, it is a first object of the present invention to provide a recording method for extra-high-density recording, and a recording/reproducing apparatus and a magneto-optical head which are suitable therefor.

It is a second object of the invention to provide a reproducing method for reproduction at high reproducing resolution of extra-high-density information recorded on a magneto-optical recording medium.

In accordance with a first aspect of the invention, a recording method is provided for recording information on a magneto-optical recording medium by applying a magnetic field to a heat spot heated by a light spot, the method comprising the steps of:

moving the light spot relative to the recording medium in such a manner that a high temperature region of the heat spot is formed outside the light spot; and applying a magnetic field to the high temperature region of the heat spot.

The recording method according to the first aspect of the invention includes forming on the track of a magneto-optical recording medium a light spot moving relative to the medium, and forming outside the light spot a high temperature region of the heat spot produced by the light spot. This method also includes applying a recording magnetic field to the formed high temperature region to form a recording magnetic domain in the recording layer of the recording medium. In order to apply a magnetic field only to a narrow region such as the high temperature region of the heat spot, a magnetic head may be used which includes a magnetic field generating section a width of which is narrower in the direction along the track than the light spot. In this specification, the "high temperature region" conceptionally means a temperature region including the heat center, that is, the highest temperature point of the heat spot produced by a light spot which is formed on and moving relative to a magneto-optical recording medium. During information recordation, the coercive force of the recording layer of the recording medium decreases in the high temperature region so that a recording magnetic domain can be formed in this region of the recording layer. During information reproduction, the coercive force of the reproducing layer of the medium decreases in the high temperature region so that a recording magnetic domain of the recording layer can be transferred to this region of the reproducing layer. Herein, the terms "outside the (a) light spot" mean the outside of the region defined by the radial position where the light intensity is $1/e^2$ of its maximum value in the light intensity distribution is a radial direction of the light spot formed on a magneto-optical recording medium.

In the recording method according to the invention, a high temperature region of a heat spot may be formed outside the associated light spot on a rotating magneto-optical recording medium by increasing the rotational speed of the medium to increase the linear velocity of that point of the medium which is scanned with a magneto-optical head. Alternatively, if the rotational speed of the recording medium is not increased, the diameter of the light spot may be reduced further or the light intensity may be adjusted for that purpose.

The recording method according to the invention makes it possible to form rectangular recording magnetic domain in the recording layer. Under the conventional recording method, the shape of the recording magnetic domains reflects the heat spot. Consequently, if these magnetic domains are subsequently written, they take a form of feathers of an arrow, which is not necessarily desirable. In some cases, the tail of each of the domains adjoining in the direction along the track of a magneto-optical recording medium interferes with the head of the succeeding domain. Consequently, in some cases, noise is produced during information reproduction. The recording method according to the invention makes it possible to apply a narrow magnetic field only to the highest temperature region of a heat spot with a magnetic head which is narrower than the associated light spot. This makes it possible to form rectangular recording magnetic domains in the recording layer of a magneto-optical recording medium. Even if the rectangular domains adjoin in the direction along the track of the recording medium, their interference with each other decreases. This makes it possible to space the magnetic domains closely for extra-high-density-recording.

In accordance with a second aspect of the invention, a recording method is provided for recording information on a magneto-optical recording medium by applying a magnetic field to a heat spot heated by a light spot, the method comprising the steps of:

moving the light spot relative to the recording medium in such a manner that a high temperature region of the heat spot is formed off the center of the light spot in the direction along a track of the medium; and applying a magnetic field to the inside of the high temperature region of the heat spot.

The recording method according to the second aspect of the invention includes forming on a magneto-optical recording medium a light spot moving relative to the medium, and forming a high temperature region of a heat spot at a position displaced from the center of the light spot in the direction along the track of the medium. The heat spot is produced on the basis of the light intensity distribution in the light spot. This method also includes applying a recording magnetic field to the inside of the formed high temperature region to form a recording magnetic domain in the recording layer of the recording medium. In order to apply a magnetic field only to a narrow region such as the high temperature region of the heat spot, a magnetic head may be used which includes a magnetic field generator narrower in the direction along the track than the light spot. Herein, the "application of a recording magnetic field to the inside of the high temperature region" means the application of a recording magnetic field to a region lying inside the high temperature region in the direction along the track. In this sense, the magnetic field may be applied to a region which is wider in the direction across the track than the high temperature region. Otherwise, the magnetic field may be applied to a region lying entirely inside the high temperature region.

In accordance with a third aspect of the invention, a reproducing method is provided for a magneto-optical recording medium including a recording layer and a reproducing layer, the method being characterized by the steps of:

moving a light spot relative to the recording medium in such a manner that a high temperature region of a heat spot is formed outside of the light spot on the reproducing layer; and applying a magnetic field to the inside of the high temperature region of the heat spot to transfer a magnetic domain of the recording layer to the reproducing layer.

This method forms on a magneto-optical recording medium a light spot moving relative to the medium, and may form a high temperature region of a heat spot outside the light spot. The method also includes applying a reproducing magnetic field locally to the formed high temperature region to transfer a recording magnetic domain of the recording layer of the recording medium to the reproducing layer of the medium, from which information is reproduced. This remarkably improves the reproducing resolution for the reason stated below. The statement made below refers to MAMMOS reproduction as an example.

As shown in an upper portion of FIG. 6, a conventional reproducing method involves applying a reproducing magnetic field with a magnetic coil uniformly to a region which is wider than a light spot on a magneto-optical recording medium. This method includes forming in the light spot a high temperature region which is nearly equal in size to the recording magnetic domains formed in the recording layer of the recording medium, and applying a reproducing magnetic field to a region which is wider than the light spot to magnetically transfer a recording magnetic domain through the high temperature region to the reproducing layer, where the domain is enlarged. Therefore, the reproducing resolution depends on the size of the high temperature region of the heat spot which is based on the light intensity distribution produced by light beam radiation.

The reproducing method according to the invention includes forming a high temperature region of a heat spot outside the associated light spot, and applying a reproducing magnetic field locally to the high temperature region in the heat spot. Therefore, the reproducing resolution depends on the region to which the magnetic field is applied. Specifically, as shown in a lower portion of FIG. 6, the irradiation of the reproducing layer of a magneto-optical recording medium with a reproducing light beam forms a heat distribution in a light spot Sw on the this layer, so that a temperature region (high temperature region) where a recording magnetic domain can be transferred appears. A magnetic head 60 includes a magnetic field generator having a width W which is narrower than the light spot Sw. The magnetic head 60 applies a reproducing magnetic field to the temperature region in such a manner that the region to which the magnetic field is applied is narrow. This transfers a magnetic domain of the recording layer to the narrow region to which the magnetic field has been applied in the reproducing layer. The magnetic domain transferred to the reproducing layer enlarges in the light spot of the reproducing layer in accordance with the heat distribution produced by light radiation. Therefore, the reproducing method according to the invention makes it possible to reliably or securely extract a minute recording magnetic domain from a light spot and enlarge the domain.

In accordance with a fourth aspect of the invention, a reproducing method is provided for a magneto-optical recording medium including a recording layer and a reproducing layer, the method being characterized by the steps of:

moving a light spot relative to the recording medium in such a manner that a high temperature region of a heat spot is formed off the center of the light spot on the reproducing layer; and applying a magnetic field to the inside of the high temperature region of the heat spot to transfer a magnetic domain of the recording layer to the reproducing layer.

The reproducing method according to the fourth aspect of the invention includes forming on a magneto-optical recording medium a light spot moving relative to the medium, and forming a high temperature region of a heat spot at a predetermined position on the reproducing layer which is displaced from the center of the light spot in the direction along the track of the recording medium. This method also includes applying a reproducing magnetic field to the inside of the high temperature region on the reproducing layer to transfer a magnetic domain of the recording layer to the region to which the magnetic field is applied in the high temperature region of the reproducing layer, from which information is read out. The reproducing layer may be a magnetic domain-enlarging/reproducing layer. In this case, on the basis of the heat distribution produced in the reproducing layer by light radiation, the magnetic domain transferred to the magnetic domain-enlarging/reproducing layer can be enlarged in the light spot so that information can be reproduced.

In accordance with a fifth aspect of the invention, a recording/reproducing apparatus is provided for a magneto-optical recording medium, the apparatus being characterized in that it comprises:

a light source for irradiating the recording medium with a light beam;

a lens for condensing the light beam from the light source to form a light spot on the recording medium;

a magnetic field source for applying a magnetic field to the recording medium; and a device for moving the light spot and the recording medium relative to each other in such a manner that a high temperature region of a heat spot produced on the basis of the heat intensity distribution of the light spot is formed outside the light spot;

the field source and the lens being so positioned that the magnetic field is applied to the high temperature region.

The recording/reproducing apparatus according to the invention includes a device for moving a light spot and a magneto-optical recording medium relative to each other to form outside the light spot a high temperature region of a heat spot produced on the basis of the heat intensity distribution of the light spot. A magnetic field source and a lens are positioned relative to each other in such a manner that a magnetic field is applied to the high temperature region. The magnetic field source and the lens may be positioned relative to each other in such a manner that the axis of the magnetic field generator of the magnetic field source coincides with the heat center (highest temperature) of the heat spot. The device for moving a light spot and a magneto-optical recording medium relative to each other may be a rotating driver for rotating a magneto-optical recording medium while controlling it at a desired rotational speed, or a device (scanner) for scanning a magneto-optical recording medium with a light spot. The irradiation of a rotating magneto-optical recording medium with a light beam produces in the recording layer of the medium a heat distribution based on the light intensity distribution. Since the rate of heat transfer is constant within the recording layer of a magneto-optical recording medium. If the rotational speed of the recording medium increases, the heat center of a heat spot is formed in back of the center of a light spot. FIG. 4 shows the relation between the rotational speed of a magneto-optical recording medium and the distance between the center of a light spot on the medium and the heat center of the associated heat spot. Accordingly, by rotating a magneto-optical recording medium at a desired speed while controlling the rotational speed by means of the rotating driver, it is possible to form the heat center of a heat spot outside the associated light spot. The magnetic field source and the lens are so positioned that the axis of the magnetic field generator of the magnetic field source coincides with the heat center of the heat spot which is formed outside the light spot.

A conventional recording/reproducing apparatus includes a magnetic field source having a magnetic field generator aligned with the axis of a lens so as not to intercept the light beam outgoing from the lens. Because the conventional apparatus applies a magnetic field to a wide region including a light spot, it is not possible to locally apply the field only to the highest temperature region of the heat spot which is based on the light intensity distribution.

In order to form outside a light spot a high temperature region of the heat spot which is produced on the basis of the light intensity distribution of the light spot, the present invention may include adjusting the diameter of the light spot and/or the light intensity, in addition to adjusting the relative speed between the light spot and the magneto-optical recording medium. This may be achieved by a high NA lens for making the light spot minute or a device for adjusting the intensity of the light beam radiated to the recording medium. For the material of the recording layer of the recording medium, the rate of heat transfer is constant. Consequently, if the light beam is radiated while the recording medium is rotated at a constant speed, the heat center of the heat spot which is produced on the basis of the heat intensity distribution is formed at a certain distance from the center of the light spot. Therefore, by using the high NA lens to make the light spot small, it is possible to form the heat center of the heat spot outside the light spot. The high NA lens may be a lens having a numerical aperture ranging between 0.7 and 0.95, or a pair of lenses consisting of a solid immersion lens (SIL) and a condensing lens for condensing a light beam to the SIL.

The recording/reproducing apparatus according to the invention may include a spindle motor or another rotating driver for rotating a magneto-optical recording medium at a desired speed. This apparatus may further include a controller for calculating a linear velocity from the rotational speed of the recording medium and the position of the magnetic field source over the medium, and controlling on the basis of the calculated linear velocity the distance between the center of the light spot and the region to which the magnetic field is applied. The controller may include a two-axis (biaxial) actuator which is used in, for example, an optical pickup. That is to say, it is possible to vary the position where the light beam is condensed by driving the actuator which changes the condensing lens while the magnetic field application region is maintained in a predetermined position. This makes it possible to control the distance between the center of the light spot and the field application region. Alternatively, as shown in FIG. 8, a galvanomirror 4 may be used to finely control the direction of the light beam incident on a pair of lenses 6. This, too, makes it possible to adjust the position where the light beam outgoing from the lens(es) is condensed. It is therefore possible to change the position of the center of the light spot.

In accordance with a sixth aspect of the invention, a magneto-optical head is provided for recording information on and/or reproducing information from a magneto-optical recording medium, the head being characterized in that it comprises:

a lens for condensing a light beam onto the recording medium; and a magnetic field source for applying a magnetic field to the recording medium, the field source being narrower in the direction along the track of the medium than the diameter of a light spot formed on the medium by the lens;

the magnetic field source being formed at the bottom of the lens in such a manner that the axis of the magnetic field generated from the magnetic field source is off the axis of the lens.

The magneto-optical head according to the invention includes a magnetic field source, which may be a magnetic coil. The magnetic field source is formed at the bottom of a lens for condensing a light beam on a magneto-optical recording medium. The field source is so positioned that the center of the magnetic field generated from the source is off the optical axis of the lens. A high temperature region of the heat spot formed on a magneto-optical recording medium rotating and irradiated with a light beam is off the center of the light spot. The magnetic field generator of the field source can be positioned at the high temperature region formed off the center of the light spot. Therefore, if the field source is a magnetic head including a narrow magnetic field generator, the magnetic field can be applied only to the highest temperature region. This makes it possible to form a micro recording magnetic domain in the recording layer of the recording medium.

For example, as shown in FIG. 16, a conventional magneto-optical head 200 includes a lens (SIL) 10 and a magnetic coil (magnetic field source) 104 which are positioned coaxially with each other. Because the magnetic coil 104 is larger in diameter than the lens 10, a magnetic field is applied to the whole area of the light spot formed on a magneto-optical recording media by the lens 10. It is therefore impossible to apply the magnetic field only to the highest temperature region formed in the recording medium by light radiation. This does not allow to form a minute recording magnetic domain in the recording layer of the recording medium.

It is most preferable that the magnetic field source of the magneto-optical head according to the invention be so positioned at the bottom of the lens as not to intercept the optical path of the recording light beam or the reproducing light beam outgoing from the lens. If the field source is so positioned as to intercept the optical path, the source should preferably be so positioned that the rate of decrease in efficiency for light utilization is 50% or lower. Herein, the "efficiency for light utilization" means the ratio of the quantity of reflected light to the quantity of incident light. The quantity of incident light can be measured by a front positioned monitor, which is positioned upstream with respect to a light beam incident on a magneto-optical recording medium. The quantity of reflected light can be measured by a signal detector detecting the light beam reflected by the recording medium.

The magnetic field source of this magneto-optical head may be a thin-film magnetic head, which can be lithographically made. The magnetic head may include a one-turn coil as shown in FIG. 11(D) or a two-turn coil as shown in FIG. 13(H). For example, it is possible to make a one-turn coil type thin-film magnetic head lithographically by laminating a substrate with copper films and a dielectric film in order in such a manner that patterns as shown on the right sides of FIGS. 11(A)–11(D). For example, it is possible to make a two-turn coil type thin-film magnetic head by laminating a substrate with copper films and dielectric films so as to form patterns as shown on the right sides of FIGS. 12(A)–12(D) and 13(E)–13(H). The views on the left sides of FIGS. 11–13 are typical sections as viewed in the direction X of the plan views on the right sides. It is preferable that the substrate of each of these magnetic heads be made of transparent material such as glass or plastic. It is preferable that the difference in refractive index between the substrate and the lens be small. The material of either the substrate or the lens should preferably be so selected that the difference in refractive index is 10% of or smaller than the refractive index of one of the substrate and the lens.

The magnetic field generator of the magnetic field source of this magneto-optical head should preferably have such a width that the region of a magneto-optical recording medium to which a magnetic field is applied is narrower than a light spot, and desirably as wide as or narrower than half the diameter of the spot, in the direction along the track of the medium. The size of the region of a magneto-optical recording medium to which a magnetic field is applied may be measured by a direct observation method with a magnetic force microscope, a magnetic field detecting element having a magneto-resistance effect, and/or the like, or by the indirect measurement of reproduced waveform with the recording/reproducing apparatus according to the invention and a magnetic super-resolution magneto-optical disc. This indirect measurement of reproduced waveform with the recording/reproducing apparatus and a magnetic super-resolution magneto-optical disc involves monitoring the reproduced waveform while varying the position of the magnetic head, and calculating the size of the magnetic field application region from the position of this head at a time when a reproduced signal is obtained and the position of the head at a time when no reproduced signal is obtained.

A magneto-optical recording medium has a recording track where information can be recorded. The recording track may be eccentric from the recording medium. In this case, while the magneto-optical head of a recording/reproducing apparatus is scanning the eccentric track of the recording medium set in the apparatus, the eccentricity may cause the portion of the track which is positioned just under the head to fluctuate in the direction across the track. It is therefore preferable that the magnetic field generator of the magnetic field source of a magneto-optical head be long enough in the direction across the recording track to be accommodated to the positional fluctuation of the track in the direction across the track due to the eccentricity. It is also preferable that the field generator be longer in the direction across the recording track than the diameter of a light spot formed on the track. If the magnetic field source includes a two-turn coil type thin-film magnetic head as stated earlier, it may be constructed as shown in FIG. 5. With reference to FIG. 5, a thin-film magnetic head 3 includes a magnetic field generator 3a, which has a length L in the direction across the track of a magneto-optical recording medium. The length L is larger than the diameter Sw of a light spot. The magnetic head 3 should preferably be so positioned that the center of the field generator 3a is nearly coaxial with the heat center formed on the recording medium.

The magneto-optical head according to the invention may include a controller for controlling, on the basis of a linear velocity of a magneto-optical recording medium, the distance between the center of the light spot formed on the medium by the lens and the center of the magnetic field generated from the magnetic field source. The control of the distance between the center of the light spot formed on the recording medium and the center of the magnetic field may involve controlling either the condensing position of the lens or the position of the magnetic field source relative to the lens.

BRIEF DESCRIPTION OF THE DRAWINGS

FIG. 6 is views conceptionally showing a conventional method of reproduction and a method of reproduction according to the invention.

FIGS. 12 and 13 are views showing a process for making a two-turn coil type thin-film magnetic head.

DESCRIPTION OF PREFERRED EMBODIMENTS

Embodiments of the present invention will be described below in detail with reference to the drawings, but the invention is not limited to them.

Embodiment 1
[Magneto-Optical Recording/Reproducing Apparatus]

Figure 14:
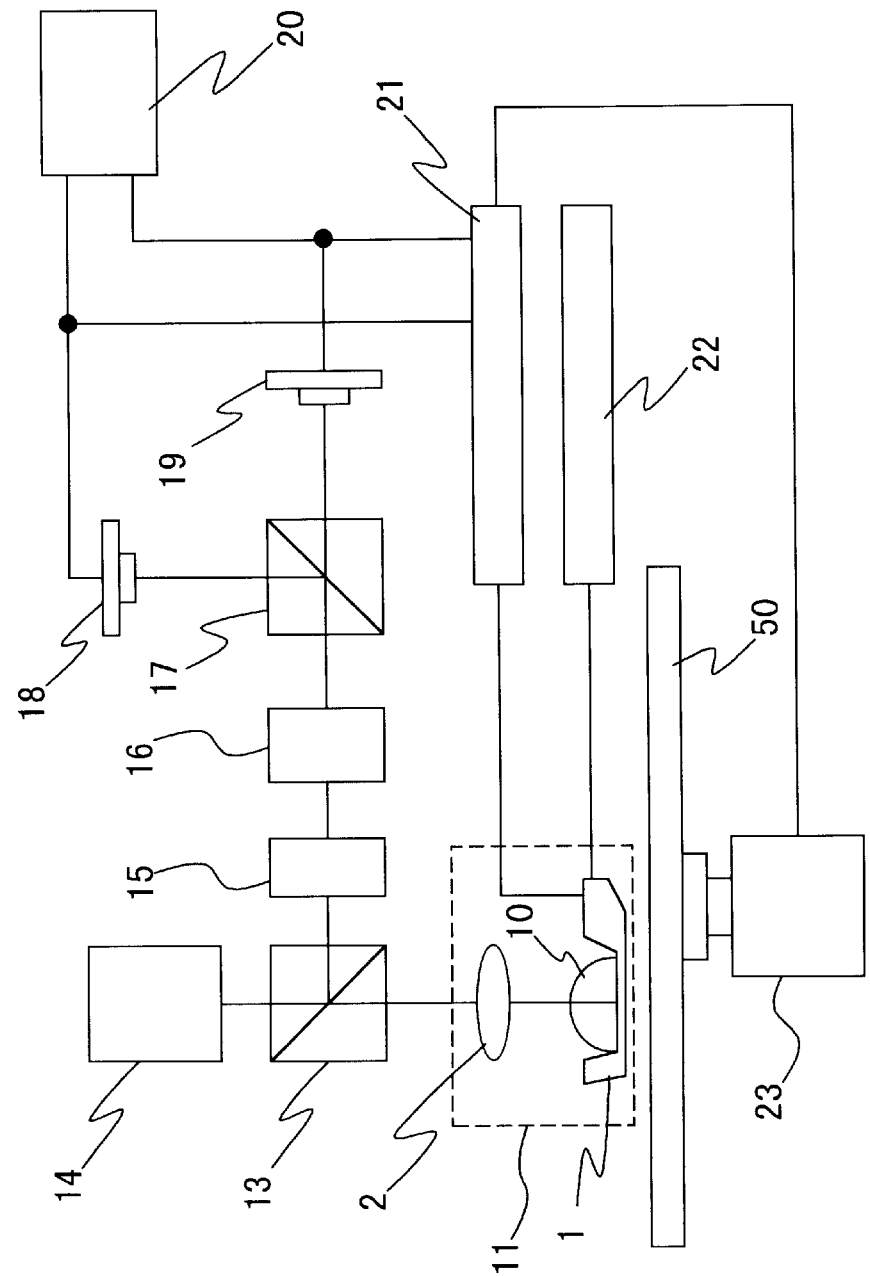
FIG. 14 is a schematic diagram of a magneto-optical recording/reproducing apparatus according to the invention.

FIG. 14 is a schematic view of a magneto-optical recording/reproducing apparatus according to the invention. This apparatus 100 mainly includes a magneto-optical head 11, a first polarizing beam splitter (PBS) 13, a laser illuminant 14, a phase plate 15, a half-wave plate 16, a second polarizing beam splitter 17, photodetectors 18 and 19, an MO signal detector 20, a head position controller 21, an external magnetic field application controller 22 and a spindle motor 23. The magneto-optical head 11 includes a slider 1, a condensing lens 12 and a solid immersion lens (SIL) 10.

The spindle motor 23 can rotate a magneto-optical recording medium at desired speed in the magneto-optical recording/reproducing apparatus 100. The laser illuminant 14 emits a laser beam, which passes through the first PBS 13 and the condensing lens 12. The laser beam is then condensed by the SIL 10. The condensed beam is radiated onto the recording medium. The recording medium reflects the radiated beam. The reflected beam returns through the SIL 10 and the condensing lens 12 to the first PBS 13, where it is directed toward the phase plate 15. After the reflected beam passes through the phase plate 15 and the half-wave plate 16, it is split by the second PBS 17 into two beams toward the respective photodetectors 18 and 19, which can convert the quantities of light of these beams into electric signals. The signals detected by the photodetectors 18 and 19 are input to the MO signal detector 20 and the head position controller 21. On the basis of the signals detected by the photodetectors 18 and 19, the MO signal detector 20 outputs a magneto-optical (MO) reproducing signal. On the basis of the signal from the MO signal detector 20, the head position controller 21 can position the magneto-optical head 11 in a desired position over the recording medium. By acquiring the rotational speed of the spindle motor 23, the head position controller 21 can calculate the linear velocity of the spot or area of the recording medium which is positioned under the magneto-optical head 11. A galvanomirror (not shown) is mounted on or in the magneto-optical head 11. On the basis of the calculated linear velocity, the angle of the galvanomirror is finely controlled or adjusted to control the position of the spot to which the beam from the magneto-optical head 11 is radiated. A magnetic head is mounted on or in the magneto-optical head 11. The external magnetic field application controller 22 controls the magnetic head in such a manner that a recording magnetic field or a reproducing magnetic field of desired magnetic field strength can be applied to the recording medium. The applied field may be either a DC magnetic field or an AC magnetic filed.

[Magneto-Optical Head]

Figure 7:
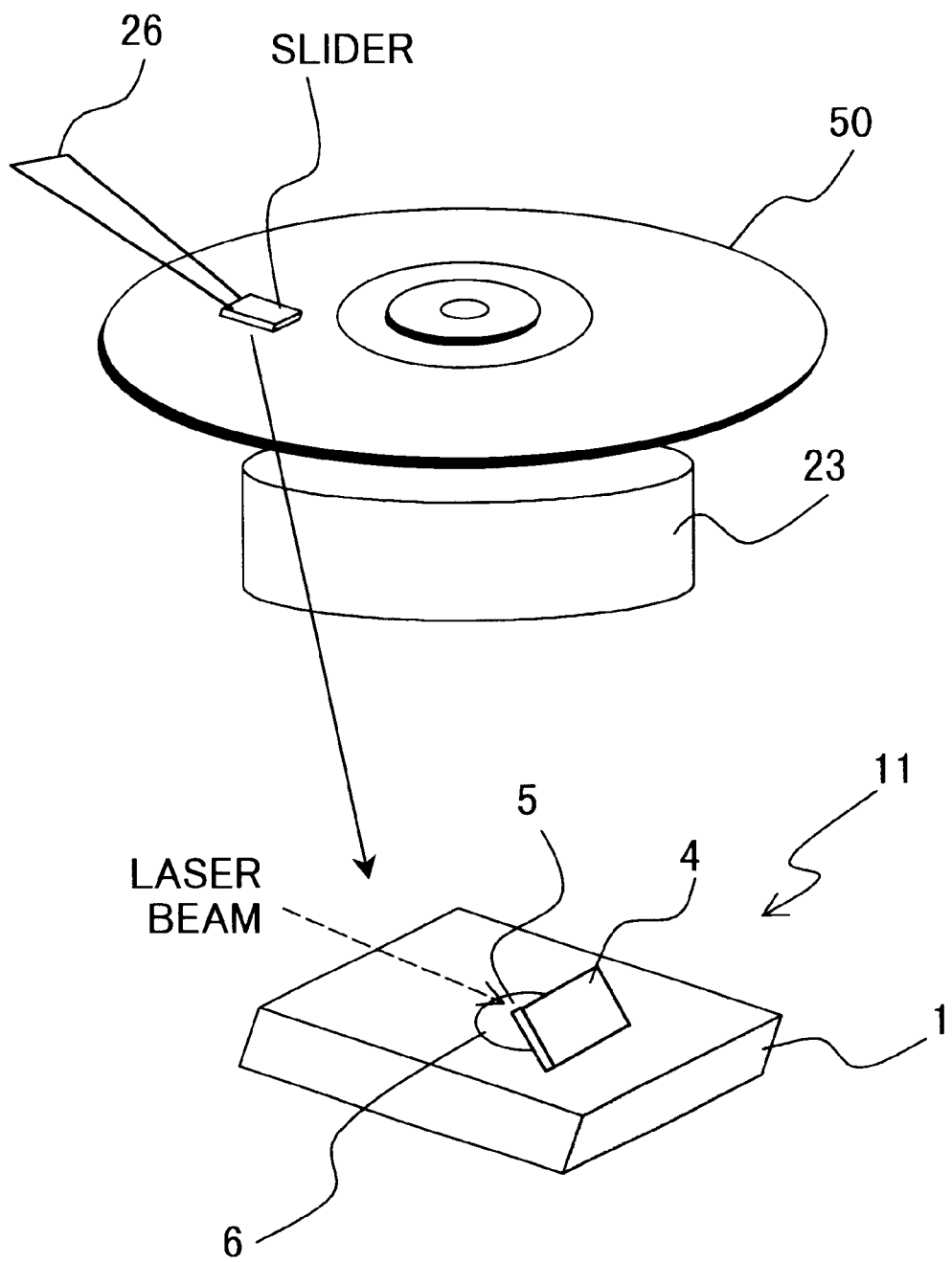
FIG. 7 is a view showing the manner in which a magneto-optical head embodying the invention is suspended or floating over a rotating magneto-optical recording medium.
Figure 8:
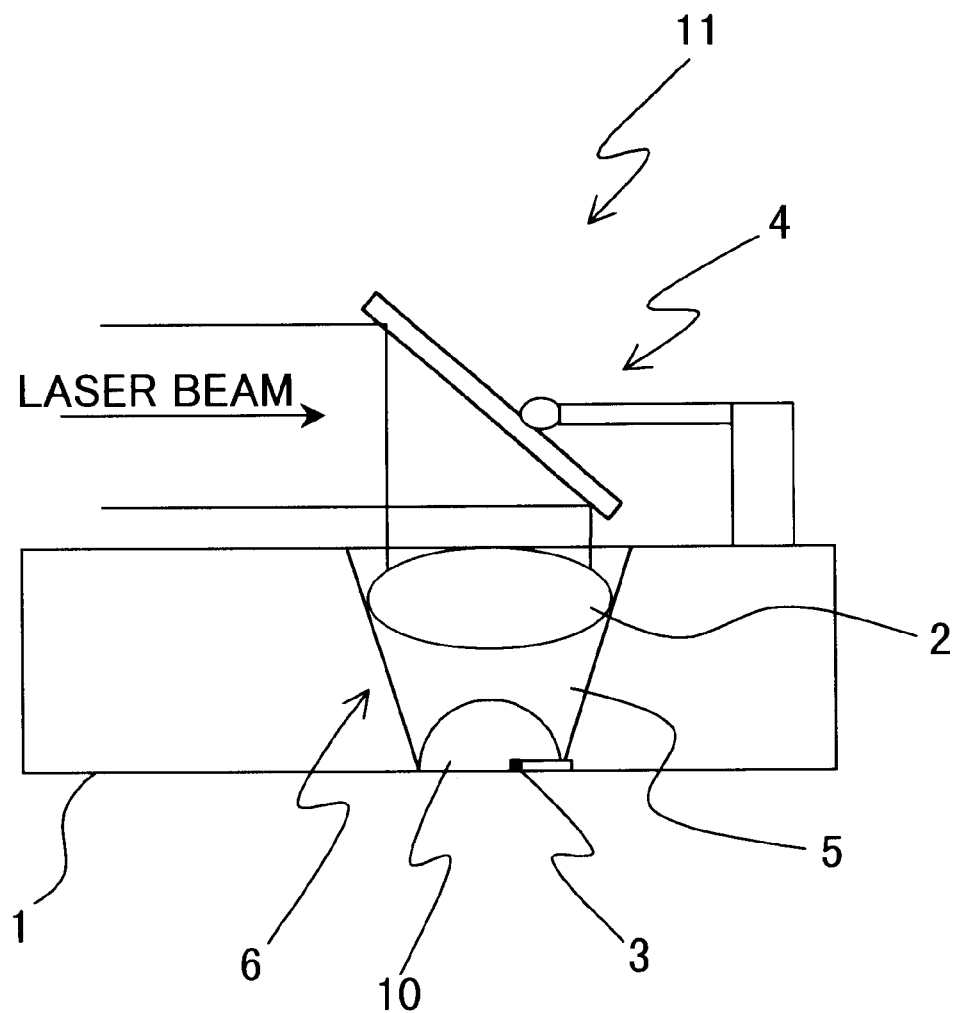
FIG. 8 is a schematic longitudinal section of the magneto-optical head shown in FIG. 7.
Figure 9:
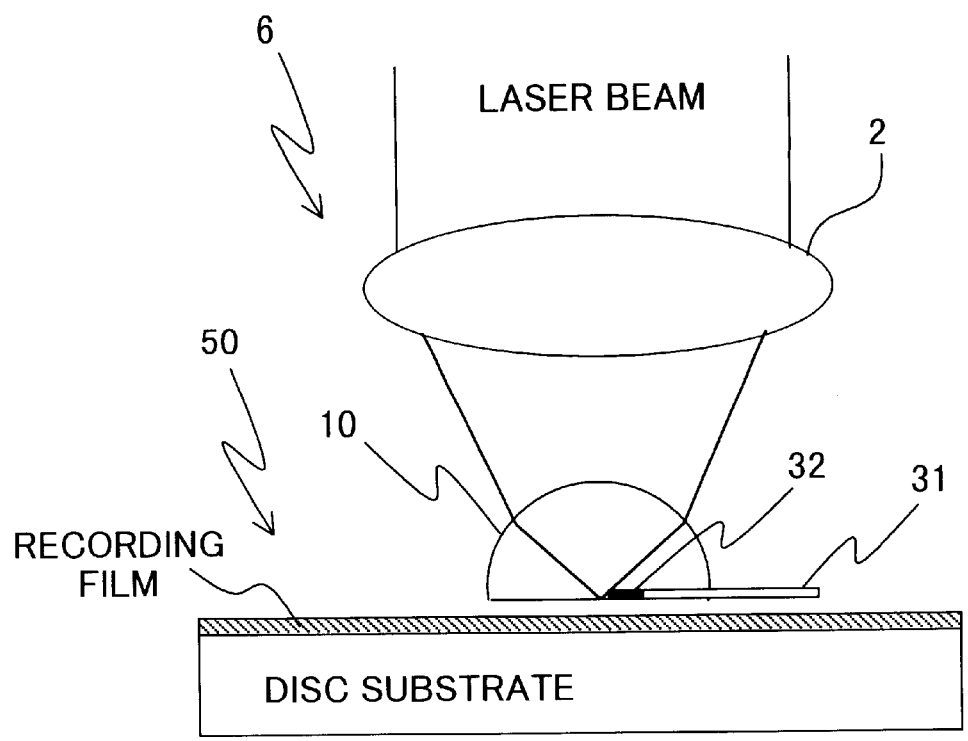
FIG. 9 is an enlarged schematic view of the pair of lenses of the magneto-optical head shown in FIG. 8 and parts near the lenses.

As shown in FIG. 7, the magneto-optical head 11 is supported by a suspension 26. During recordation and reproduction, the magneto-optical head 11 is suspended over the rotating magneto-optical recording medium 50. FIG. 7 includes, near its bottom, a schematic perspective view of the magneto-optical head 11. FIG. 8 is a schematic longitudinal section of the magneto-optical head 11. As shown in FIG. 8, the magneto-optical head 11 mainly includes a slider 1, a thin-film magnetic head 3, a galvanomirror 4 and a pair of lenses 6. The slider 1 has a hole 5 formed through it, through which a laser beam can pass, and in which the lenses 6 are positioned. The lenses 6 are a hemispheric solid immersion lens (SIL) 10 and a condensing lens 2 for condensing and radiating a laser beam to the immersion lens 10. The SIL 10 has a recess formed in the direction along its optical axis in its bottom. The magnetic head 3 is fixed in this recess. FIG. 9 is an enlarged schematic view of the pair of lenses 6 of the magneto-optical head 11 and parts in the vicinity of them. As shown in FIG. 9, the magnetic head 3 is a one-turn coil type thin-film magnetic head, which consists of a substrate 31 and a one-turn coil 32. The magnetic head 3 can vertically apply a magnetic field to the recording medium 50, which is positioned directly under it. A method for making the magnetic head 3 will be explained later. The galvanomirror 4 can turn around an axis perpendicular to the paper (FIG. 8). Fine turning of the galvanomirror 4 by various angles varies the laser beam's angle of incidence on the lenses 6. This varies the optical path of the light beam outgoing from the SIL 10 of the lenses 6, changing the position of the spot on the magneto-optical recording medium to which the beam is radiated. In other words, it is possible to control finely in the direction along the track the center of the light spot formed on the recording medium.

[Thin-film Magnetic Head]

Figure 11:
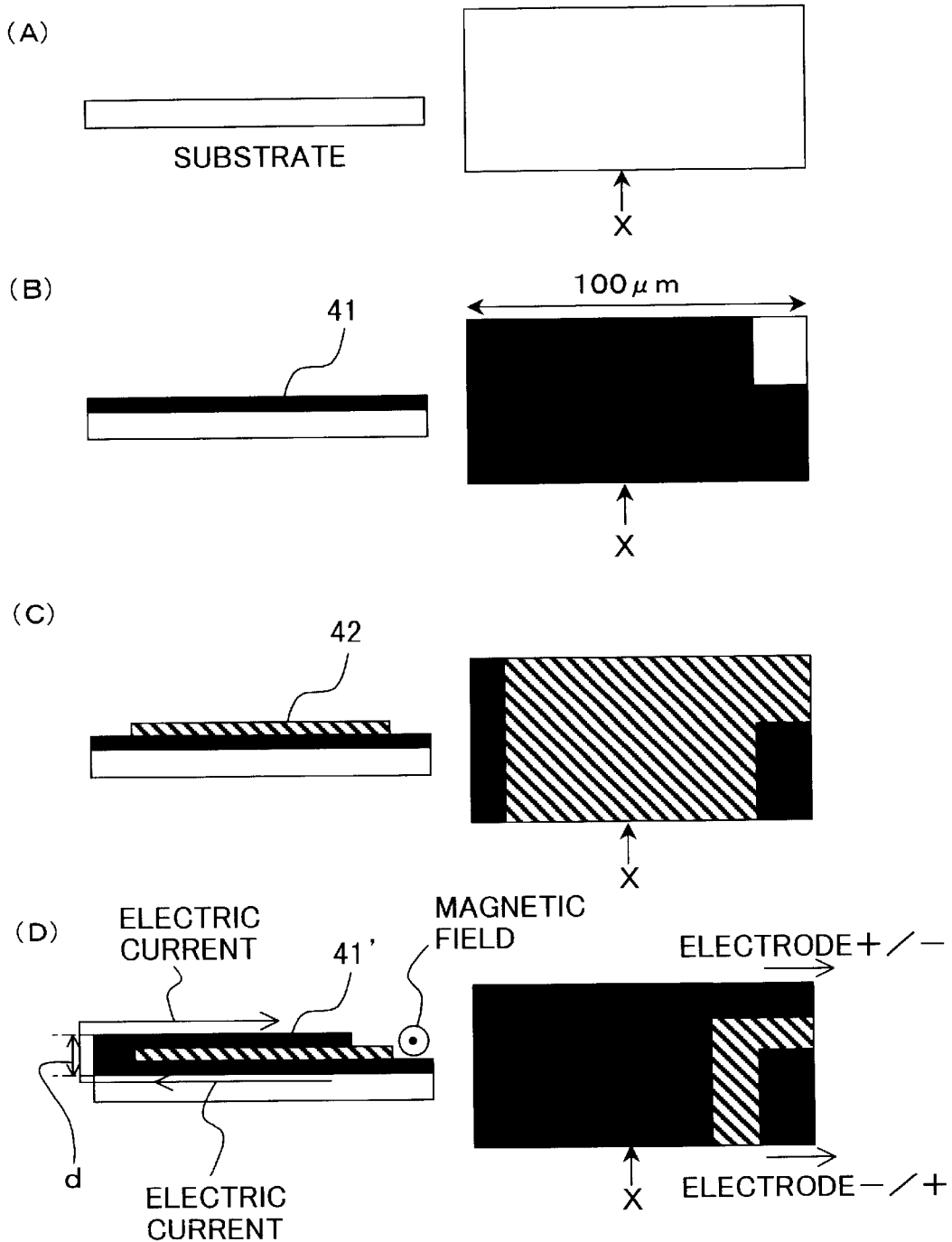
FIG. 11 is views showing a process for making a one-turn coil type thin-film magnetic head.

With reference to FIGS. 11(A)–11(D), a description will be given below of a method for making the one-turn coil type thin-film magnetic head 3 mounted on or in the magneto-optical head 11. First, as shown in FIG. 11(A), a transparent substrate in the form of a flat plate is provided. Then, a copper film 41 of desired thickness is formed on the substrate. Next, after photoresist (not shown) is applied on the copper film 41, this film is exposed (to light) and etched with a mask on it in such a manner that it is patterned as shown on the right side of FIG. 11(B). Next, after a dielectric film 42 is formed on the patterned copper film 41, photoresist (not shown) is applied on the dielectric film. Next, the dielectric film 42 is exposed and then etched with a mask on it in such a manner that it is patterned as shown on the right side of FIG. 11(C). Next, after a copper film 41' is formed on the dielectric film 42, photoresist (not shown) is applied on this copper film. Then, the copper film 41' is exposed and etched with such a mask that it is patterned as shown on the right side of FIG. 11(D). In this way, a thin-film magnetic head is made.

[Magneto-Optical Recording Medium]

Figure 10:
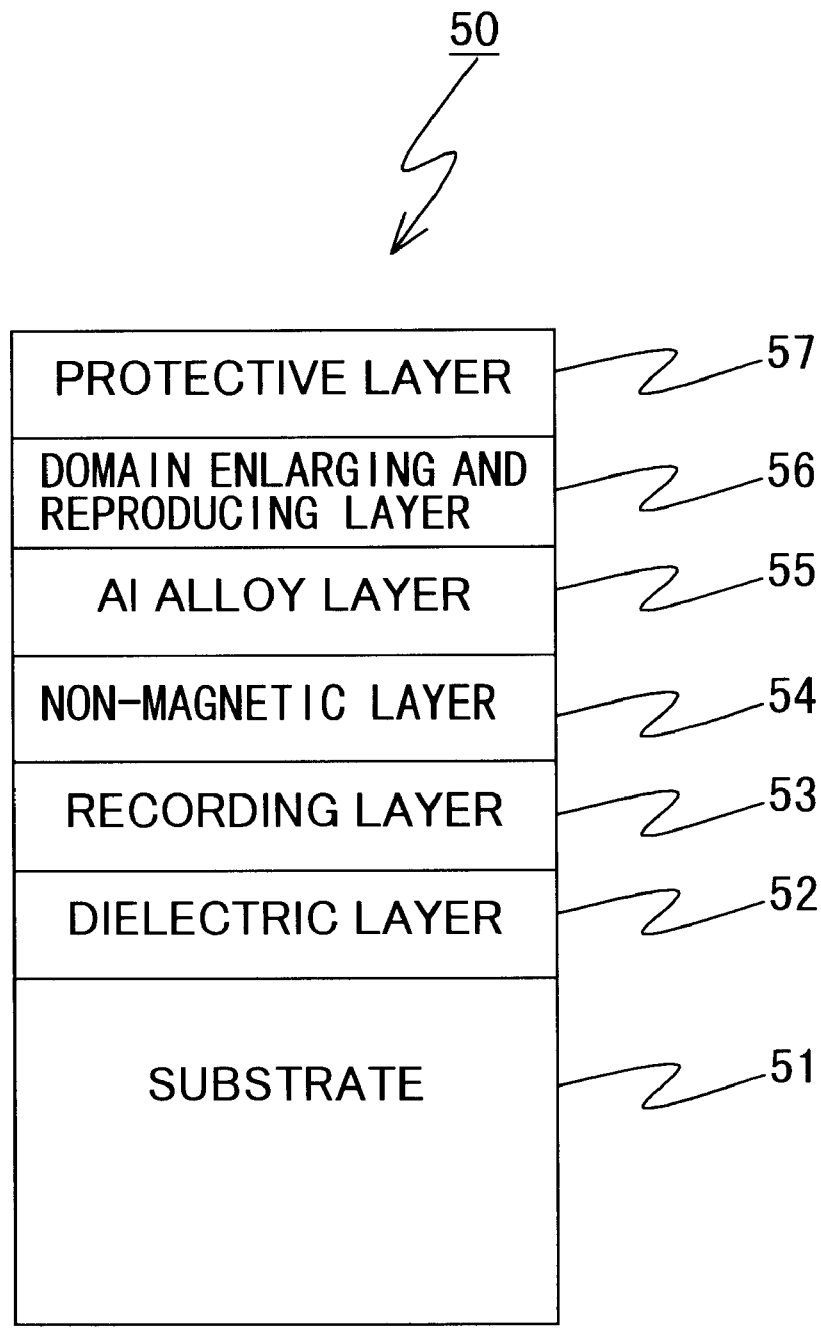
FIG. 10 is a schematic section of a specific magneto-optical recording medium for a MAMMOS.

A magneto-optical recording medium for use with the magneto-optical recording/reproducing apparatus 100 may be a magneto-optical recording medium for a MAMMOS. FIG. 10 is a schematic section of the magneto-optical recording medium 50, which includes a substrate 51, a first dielectric layer 52, a recording layer 53, a non-magnetic layer 54, an Al alloy layer 55, a magnetic domain-enlarging/reproducing layer 56, and a protective layer 57. The layers 52–57 are stacked or laminated in the above order on the substrate 51. Information can be recorded on or reproduced from the recording medium 50 with a light beam incident on the side of the medium which is opposite to the substrate 51, that is, on the side where the films such as the recording layer 53 and the magnetic domain-enlarging/reproducing layer 54 lie. The substrate 51 may be a polycarbonate substrate. The substrate 51 can be formed as a land and groove type substrate having a land and a groove. Information can be recorded in both the land and the groove. The first dielectric layer 52, the non-magnetic layer 54 and the protective layer 57 may be made of SiN. In the magnetic domain-enlarging/reproducing layer 56, the magnetic domains transferred from the recording layer 53 can be enlarged, and information can be reproduced from the enlarged domains. This enlarging and reproducing layer 56 may be made of GdFeCo amorphous alloy. The composition of this alloy is preadjusted to have such coercive force that the magnetic domains transferred from the recording layer 53 can be enlarged and reduced in size easily by the movement of the domain walls due to the application of an external magnetic field. The recording layer 53 is a layer for recording information on it in the form of magnetization direction, and is made of TbFeCo amorphous alloy. The recording layer 53 and the magnetic domain-enlarging/reproducing layer 56 are coupled together magnetostatically through the non-magnetic layer 54 and the Al alloy layer 55, which are interposed between them. The layers 52–57 can be formed in order by a high frequency spatter method. For a magneto-optical recording medium for a MAMMOS and the principle of reproduction from the medium, reference may be made to International Publication No. WO98/02878 disclosing them in detail.

Figure 4:
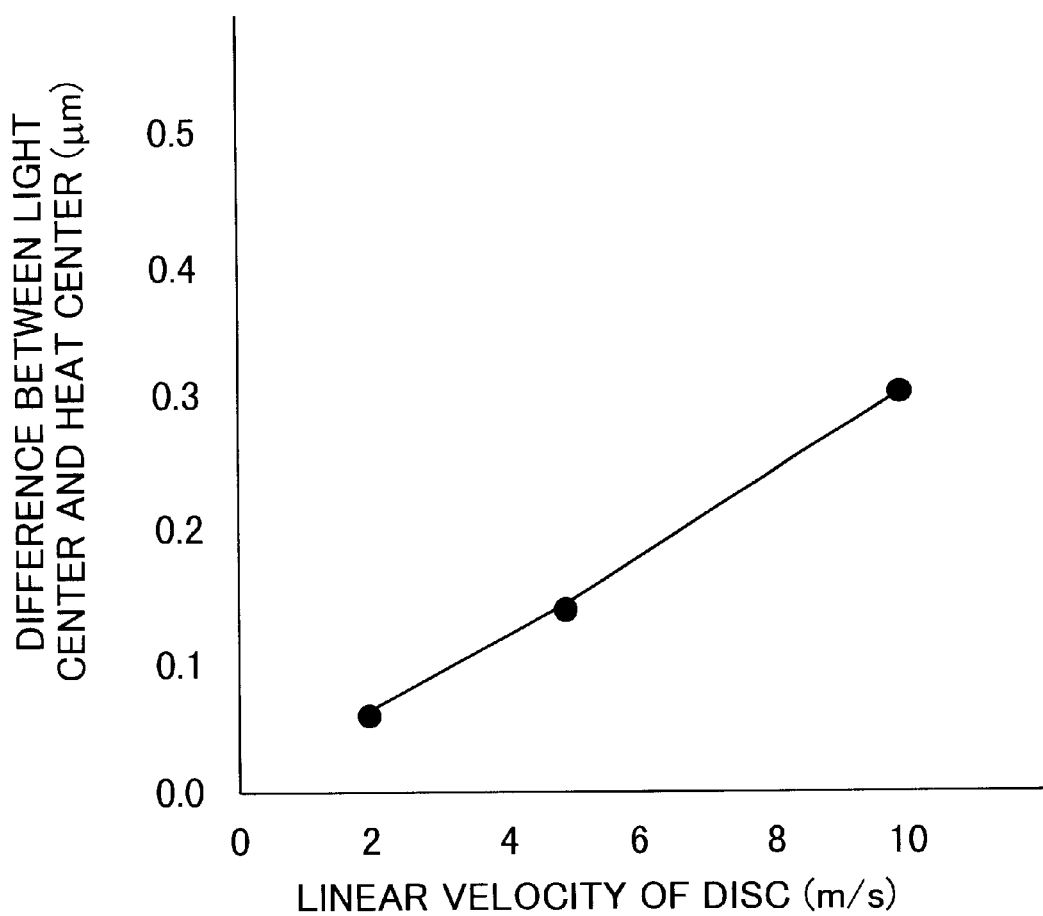
FIG. 4 is a graph of results of calculation showing the manner in which the difference between the center of a light spot and the associated heat center depends on linear velocities of a magneto-optical recording medium.
Figure 5:
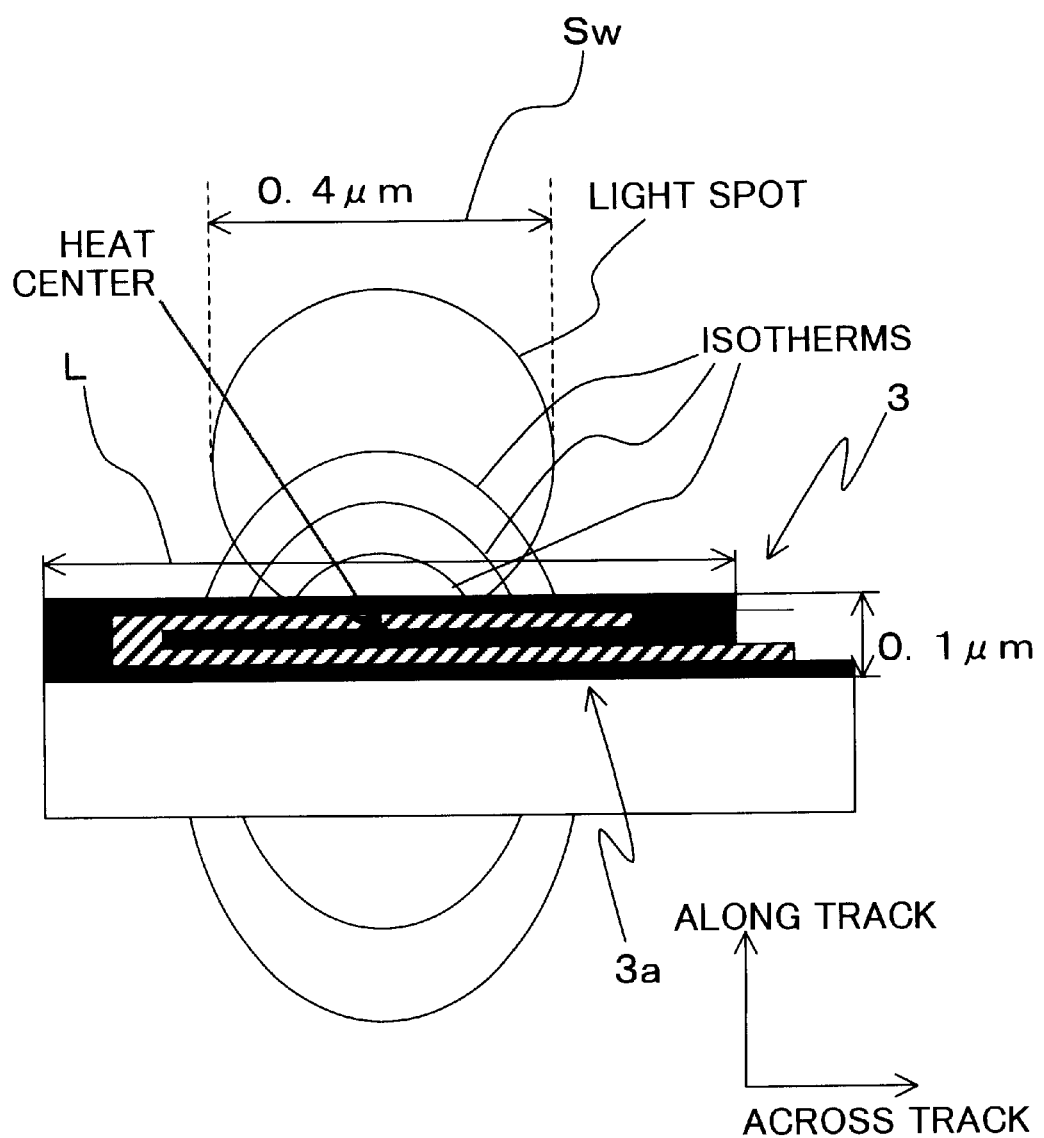
FIG. 5 is s schematic plan showing the manner in which a magnetic head is positioned over a track, and the magnetic field generator of this head is longer in the direction across the track than the diameter of a light spot.

Information can be recorded on or reproduced from the magneto-optical recording medium 50 mounted on or in the magneto-optical recording/reproducing apparatus 100. When the recording medium 50 is irradiated with a recording light beam or a reproducing light beam, a heat spot is formed in a position off the center of the light spot. The graph of FIG. 4 shows the results of calculation of the distance between the light spot center and the heat center of the recording medium rotating at various linear velocities. This calculation was based on the conditions that the wavelength of the laser beam was 405 nm, that the numerical aperture NA of the lens condensing the laser beam was 0.6, and that the power of the laser beam was 10 mW. On these conditions, the diameter and the radius of the light spot are about 0.54 micron and about 0.27 micron, respectively. It is found from FIG. 4 that, for a linear velocity of 10 meters per second, the heat center is positioned at a distance of about 0.3 micron from the light spot center, that is, outside the light spot. Accordingly, in the magneto-optical head 11 shown in FIG. 8, the angle of the galvanomirror 4 is adjusted in such a manner that the edge of the light spot formed on the recording medium by the SIL 10 is positioned at the portion (coil center) of the thin-film magnetic head 3 which generates a magnetic field. Such alignment of the heat center and the center of the magnetic coil involves detecting a magneto-optical signal from the magneto-optical recording medium while varying the angle of the galvanomirror 4 in FIG. 8 to change in the direction along the track the position where the laser beam from the SIL 10 is condensed, and then adjusting the angle of the galvanomirror 4 in such a manner that the detected signal is maximum. It is conceivable that, at this time, the heat center of the heat spot is coaxial with the center of the magnetic coil. If the magnetic field generator of the thin-film magnetic head mounted on or in the magneto-optical head 11 has a width of about 0.1 micron in the direction along the track (the width "d" of the one-turn coil in FIG. 11(D)), reproduction can be made at a resolution of 0.05 micron based on the above condition regarding the diameter of the light spot, the positional relation between the light spot center and the heat center, and the width of the magnetic field applying portion of the magnetic head. Since this resolution corresponds to one tenth of the light spot diameter or smaller, this method improves the resolution in the conventional method five times.

[Methods for Recording Information and Reproducing Information]

Figure 1:
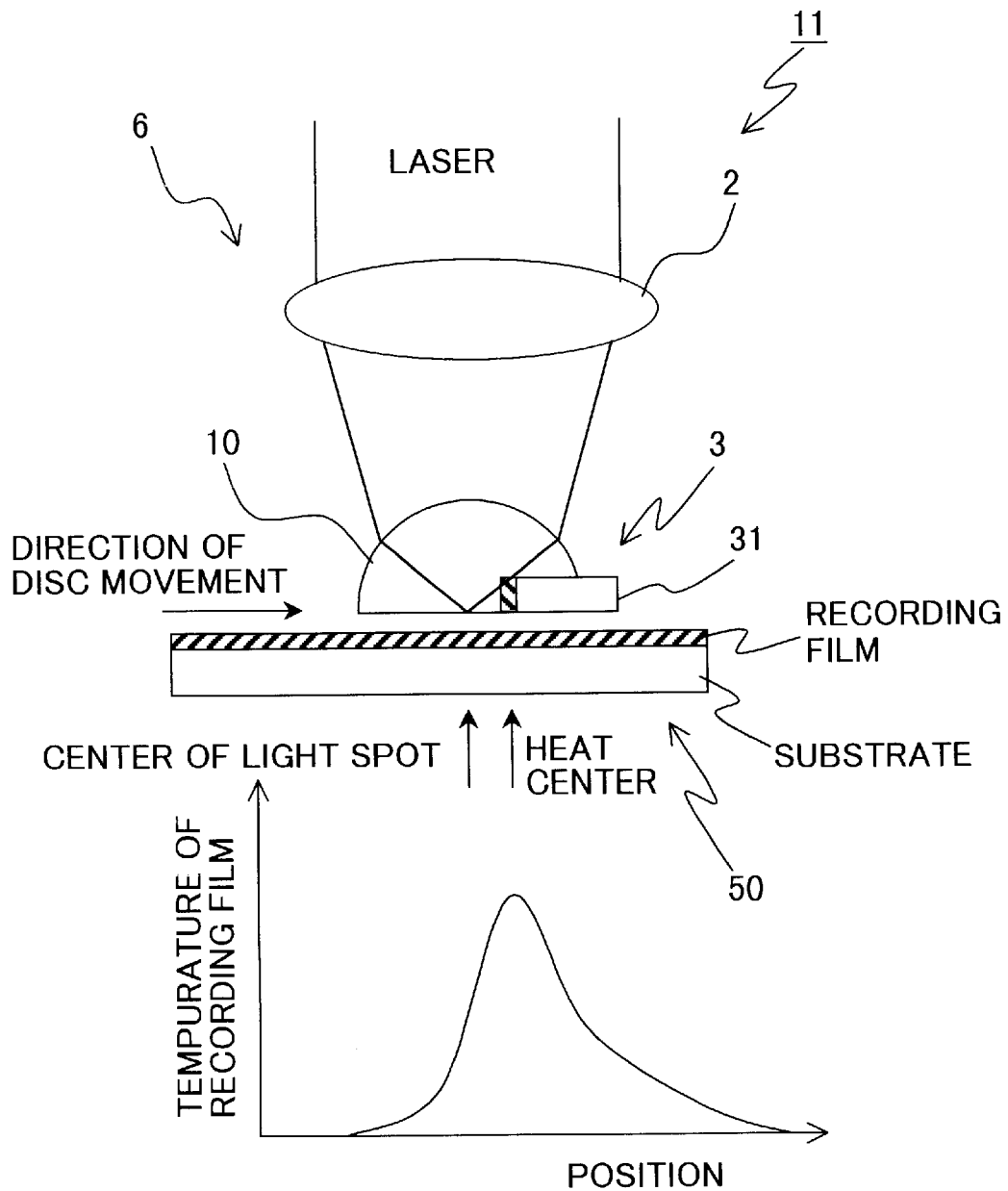
FIG. 1 is a view and a graph conceptionally showing a heat distribution produced in a recording layer by a magneto-optical head according to the present invention.

A method for recording information and a method for reproducing information will be described below. FIG. 1 includes a conceptional view of the arrangement of the pair of lenses and the thin-film magnetic head and the principle of information recordation. During information recordation, the irradiation of the magneto-optical recording medium 50 with a recording light beam by means of the lenses produces a heat distribution in the recording layer of the medium as shown in a lower portion of FIG. 1. The magneto-optical head applies a recording magnetic field only to a minute region including the heat center. Because the magnetic field generator of the thin-film magnetic head has a section as shown in FIG. 11(D), the magnetic field is narrow in the direction along the track. As a result, the recording magnetic domains formed in the recording layer are rectangular.

During information reproduction, the irradiation of the magneto-optical recording medium with a reproducing light beam produces a heat distribution in the magnetic domain-enlarging/reproducing layer of the medium. This transfers recording magnetic domains in the recording layer to the minute region including the heat center in the magnetic domain-enlarging/reproducing layer, where the domains are enlarged by a reproducing magnetic field applied by the magnetic coil of the magneto-optical head. Even though recording magnetic domains exist in front and/or back of the magneto-optical head in the direction along the track, because the magnetic field is not applied to the region or regions where the magnetic domains exist, there is no case that the domains are erroneously transferred to the reproducing layer. This prevents accidental reproduction of information.

Embodiment 2

Figure 2:
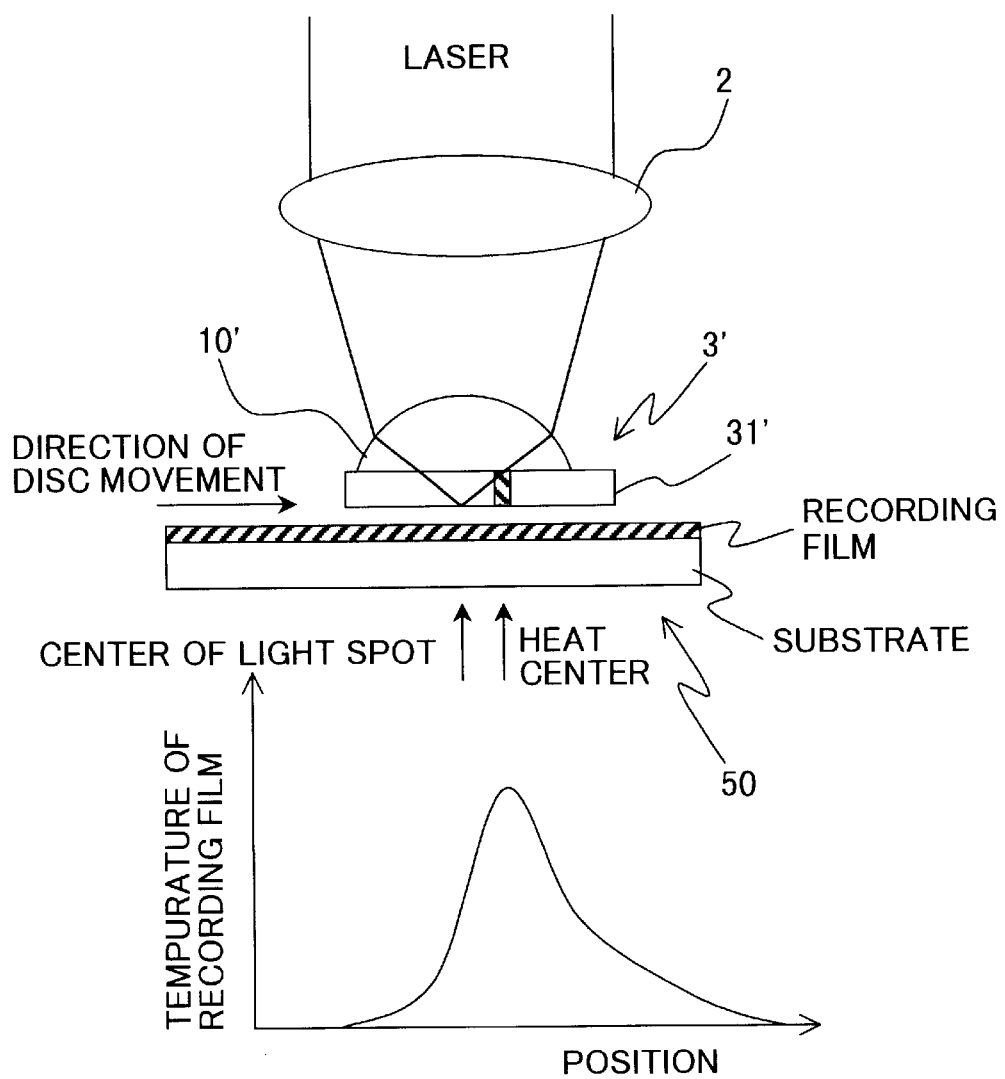
FIG. 2 is a view and a graph conceptionally showing a heat distribution produced in a recording layer by a magneto-optical head according to Embodiment 2.
Figure 15:
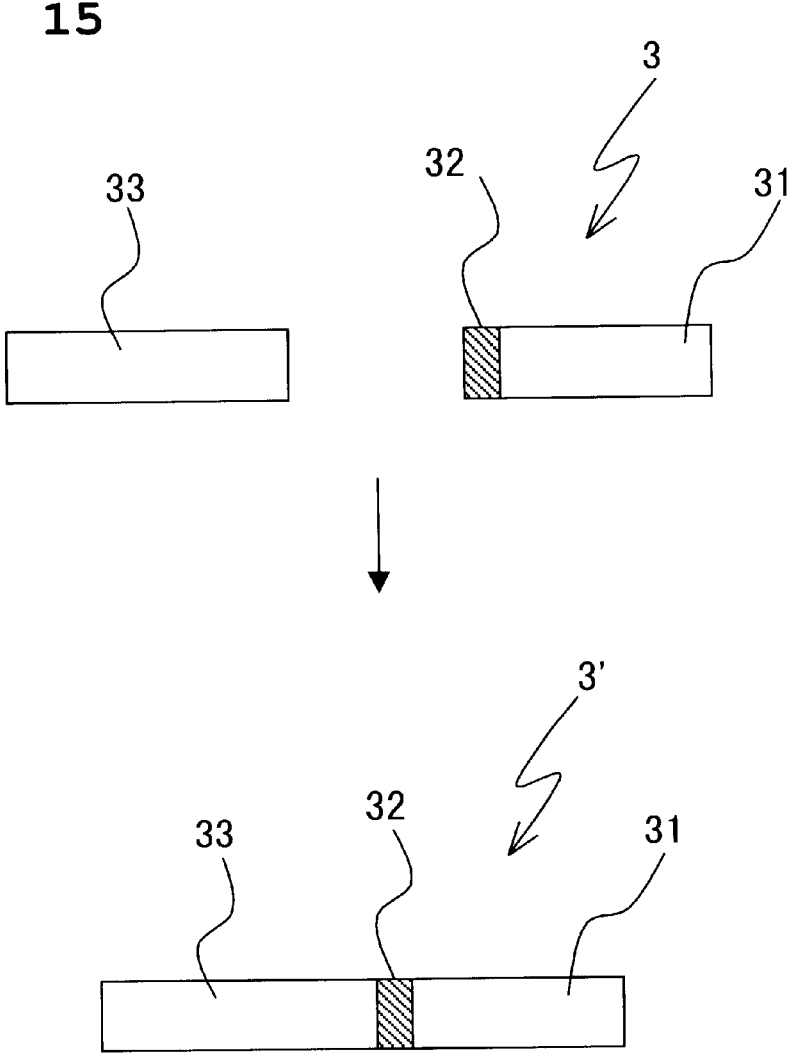
FIG. 15 is views showing a method for making the thin-film magnetic head mounted on or in the magneto-optical head shown in FIG. 2.
Figure 16:
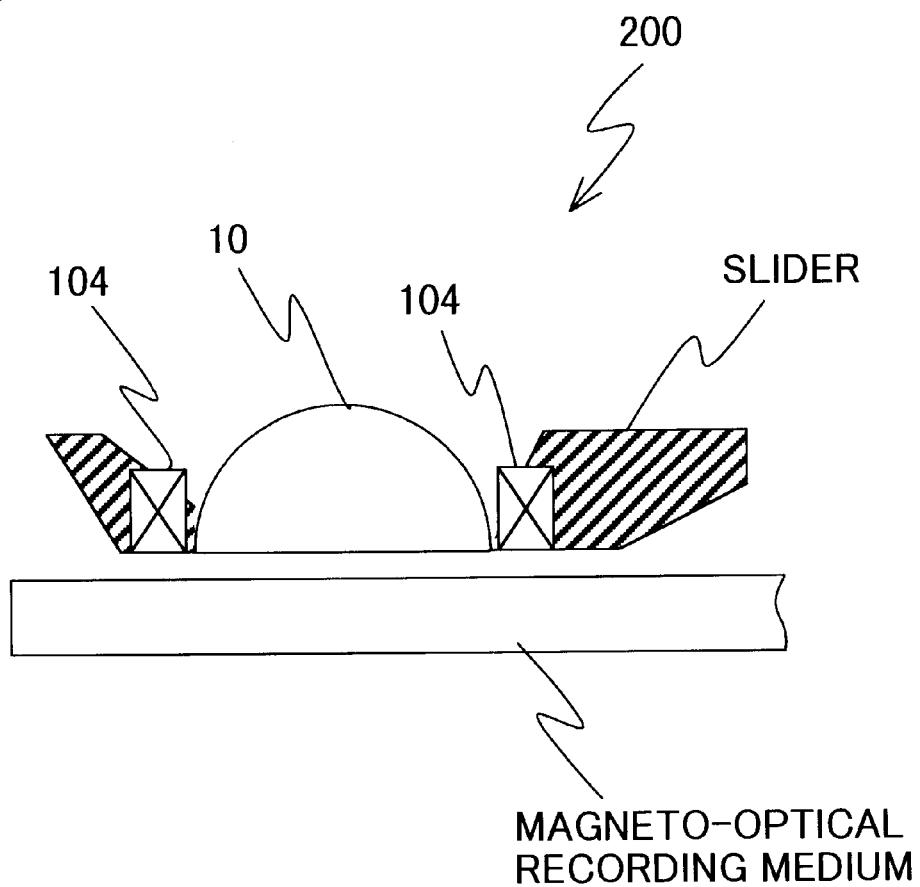
FIG. 16 is a schematic section of a conventional magneto-optical head.

FIG. 2 is a schematic diagram of a modified magneto-optical head according to the invention. In FIG. 2, the bottom of the solid immersion lens (SIL) 10' is cut off by the thickness of the substrate 31' of the thin-film magnetic head 3' in the direction along the optical axis. The SIL 10' does not have a recess as formed in the SIL mounted in the magneto-optical head of Embodiment 1. Therefore, the SIL 10' is easier to machine or work than the SIL of Embodiment 1. As shown in FIG. 15, it is possible to make the magnetic head 3' of this embodiment by sticking together a substrate 33 and a one-turn coil type thin-film magnetic head 3 which can be made as is the case with Embodiment 1. The substrate 33 and the magnetic head 3 are stuck together in such a manner that the one-turn coil 32 of this head is interposed between the substrate 33 and the substrate 31 of the head. The substrates 33 and 31 are made of the same material.

Embodiment 3

Figure 3:
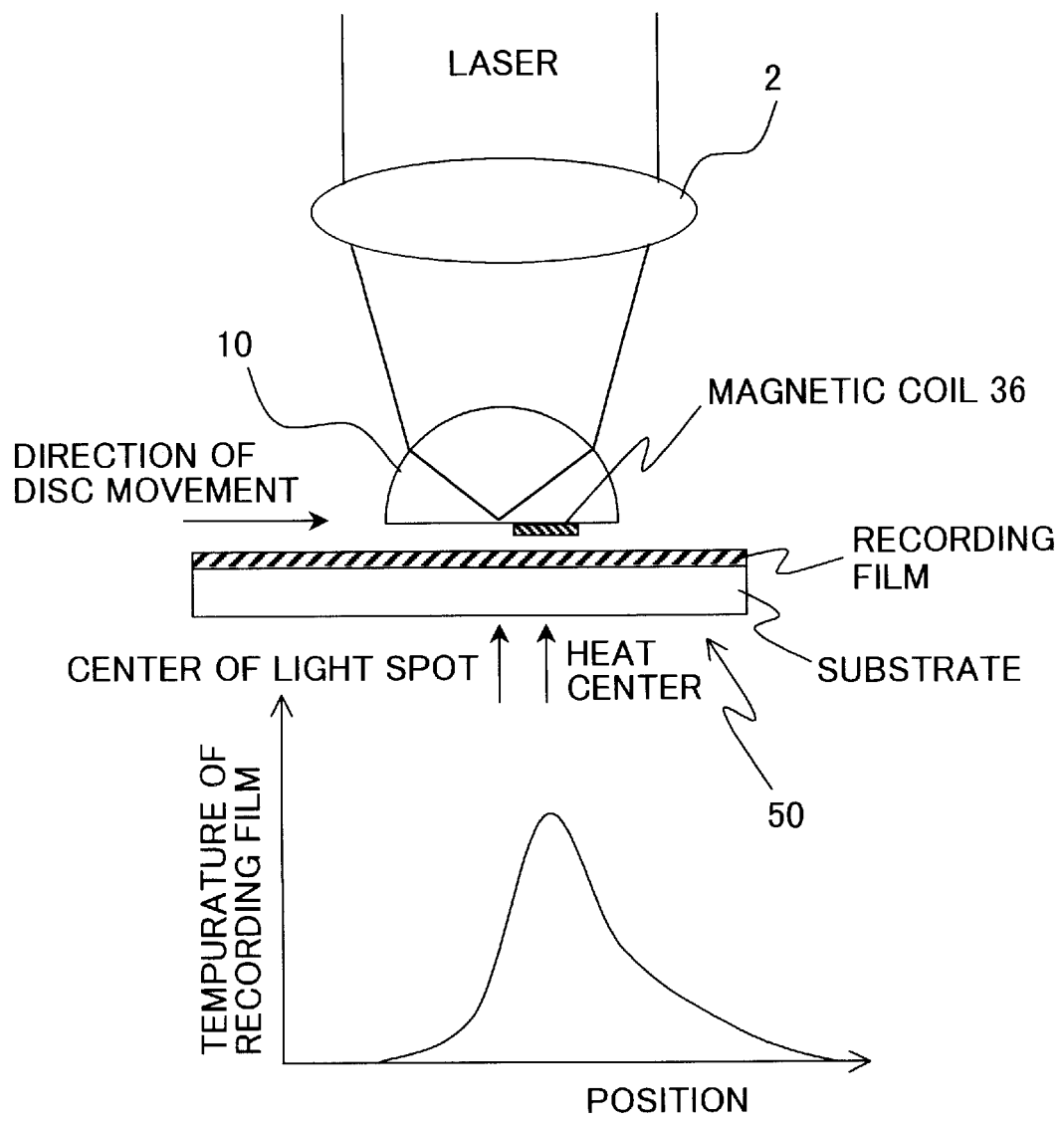
FIG. 3 is a view and a graph conceptionally showing a heat distribution produced in a recording layer by a magneto-optical head according to Embodiment 3.

FIG. 3 shows another magneto-optical head according to the invention. The magneto-optical head shown in FIG. 3 includes a spiral plane or flat magnetic coil 36 fitted on the bottom of a SIL 10, instead of the thin-film magnetic head 3 of the magneto-optical head 11 in FIG. 1. The center of the magnetic coil 36 is displaced from the optical axis of the SIL 10 in the direction along the track so that the coil 36 does not intercept the light beam outgoing from the SIL 10. The magnetic coil 36 and the SIL 10 are so positioned that the center of the coil 36 is coaxial with the heat center of the heat spot formed in the recording film of a magneto-optical recording medium by the light beam outgoing from the SIL 10.

The magneto-optical heads of Embodiments 2 and 3 can each replace the magneto-optical head 11 of the magneto-optical recording/reproducing apparatus 100 shown in FIG. 14.

The invention is not limited to the foregoing embodiments, but various modifications and improvements may of course be made. for example, in the recording/reproducing apparatus according to Embodiment 1, information is recorded or reproduced with a light beam incident on the side of a magneto-optical recording medium where a recording film lies. Alternatively, a light beam could be incident on the side of a magneto-optical recording medium where a substrate lies. In this case, at least one of the rotational speed of the recording medium, the position of the magnetic field generator of the magnetic head, and the position where the beam is radiated may be controlled in such a manner that the magnetic field generator is positioned over the highest temperature region (high temperature region including the heat center) of the heat spot formed in/the recording medium by the beam radiation.

In Embodiment 1, the heat center of the heat spot is positioned outside the light spot. Alternatively, information could be recorded or reproduced with the heat center of the heat spot positioned inside the light spot, for example, inside the edge of the light spot.

Figure 17:
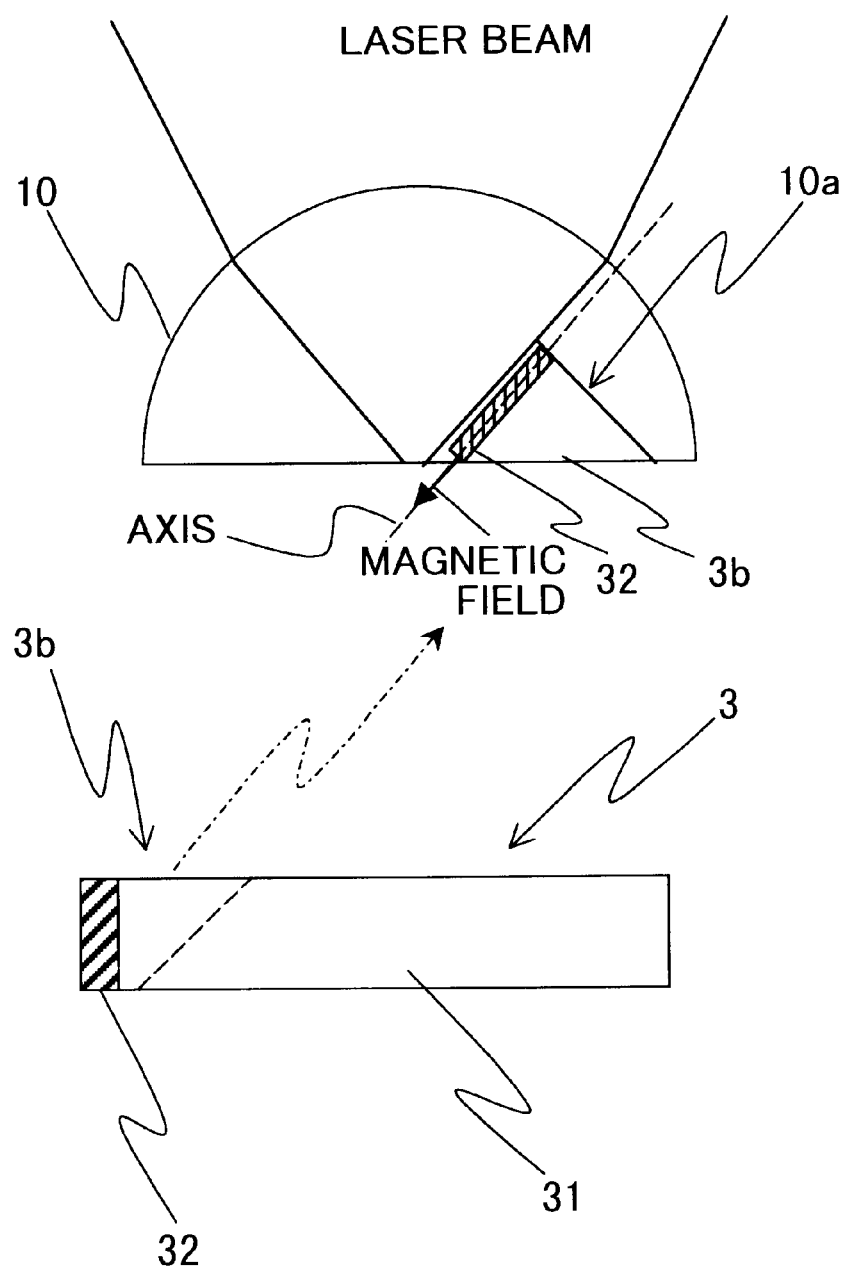
FIG. 17 is a view showing the manner in which a thin-film magnetic head is formed in a SIL in such a manner that the axis of the thin-film magnetic coil of the head inclines relative to the bottom of the SIL.

In the magneto-optical head according to Embodiment 1, as shown in FIG. 1, the thin-film magnetic head 3 is formed in such a manner that the axis of its thin-film magnetic coil is perpendicular to the bottom of the SIL. Alternatively, as shown in an upper portion of FIG. 17, a thin-film magnetic head 3b may be so positioned that the axis of its thin-film magnetic coil (magnetic field generator) 32 may incline relative to the bottom of a SIL 10. In this case, as shown in the upper portion of FIG. 17, the SIL 10 has a recess 10a formed in it. As shown in a lower portion of FIG. 17, it is possible to form the magnetic head 3b by cutting along the broken line the substrate 31 of a thin-film magnetic head 3. The magnetic head 3b is positioned in the recess 10a obliquely in such a manner that it does not intercept the optical path. This structure of a magneto-optical head prevents the magnetic head from intercepting a laser beam. The axis of the magnetic field generator of the magnetic head 3b inclines relative to the adjacent surface of a magneto-optical recording medium. Therefore, an inclined magnetic field is applied to the recording medium.

Figure 18:
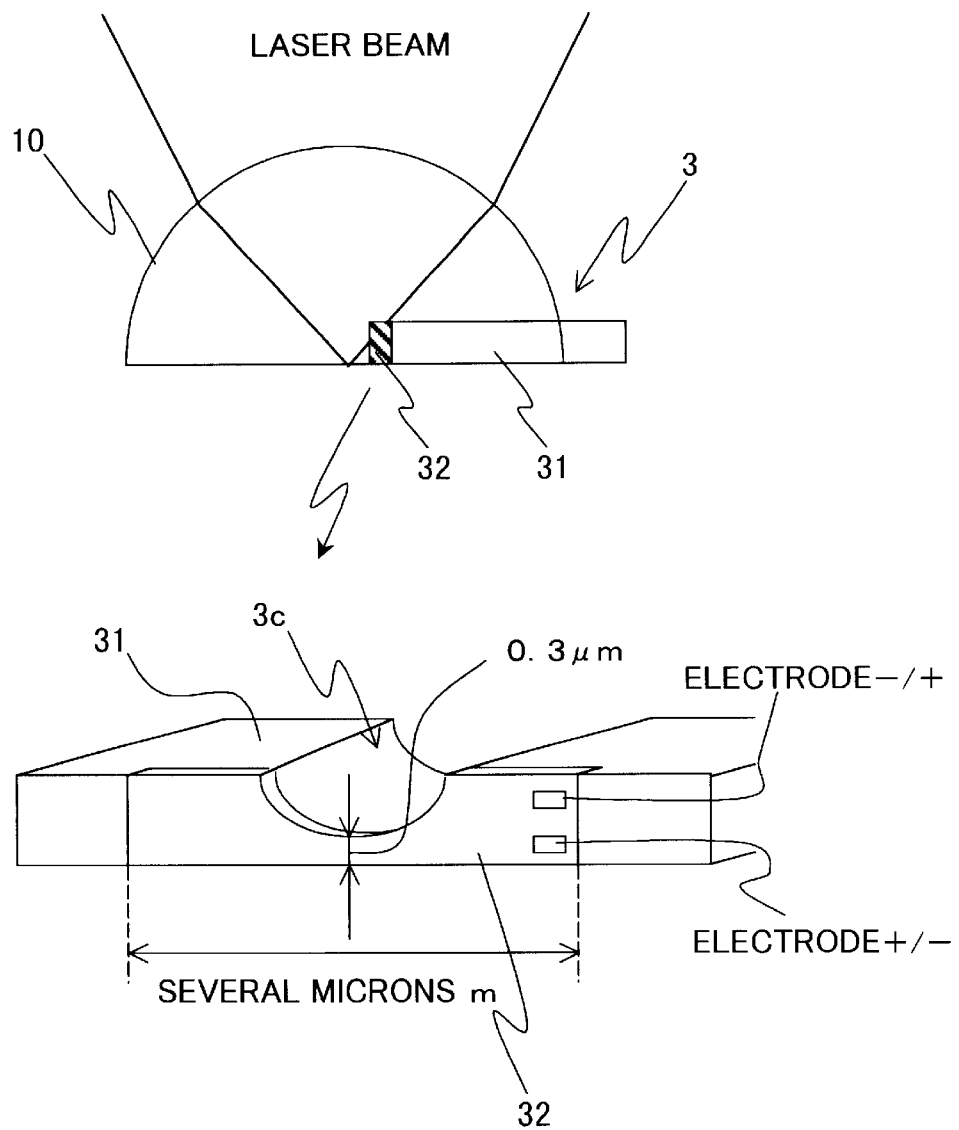
FIG. 18 is a schematic section of the SIL and the thin-film magnetic head mounted on or in a magneto-optical head, and a perspective view typically showing the sectional structure of the magnetic head as viewed obliquely on the left side of the above schematic section.

FIG. 18 shows another modified magneto-optical head. As shown in a lower portion of FIG. 18, the magnetic head 3 shown in an upper portion of FIG. 18 includes a substrate 31 and a thin-film magnetic coil 32 which have a recess 3c formed in them. A conically condensed laser beam can pass through the recess 3c. Because the recess 3c prevents the magnetic head 3 from intercepting the laser beam, the beam can be condensed efficiently on a magneto-optical recording medium.

The embodiments of the invention have been described hereinbefore. The magneto-optical recording media used for the invention, the structure of the recording/reproducing apparatus, and the optical elements and other devices used with the apparatus could be replaced by the counterparts disclosed in, for example, WO98/02878, WO98/09283, WO99/35644 and WO99/39341, the disclosure in which is incorporated herein by reference.

A recording method according to the invention includes forming outside a light spot a high temperature region produced in the recording layer of a magneto-optical recording medium by light radiation, and applying a recording magnetic field to this region. It is therefore possible to form a minute recording magnetic domain in the recording layer by narrowing the magnetic field generator of a magnetic head in the direction along the track of the recording medium, without causing the temperature region (the temperature of which is the Curie point or higher) where a recording magnetic domain can be formed to be minute. In particular, by using a thin-film magnetic head including a magnetic field generator which has a cross section as shown in FIG. 11(D), it is possible to apply a magnetic field which has a narrow width in the direction along the track (of a magneto-optical recording medium). This results in formation of a rectangular recording magnetic domain, thus enabling extra-high-density recording of information.

A reproducing method according to the invention includes forming a high temperature region outside the light spot of the reproducing layer of a magneto-optical recording medium by radiating a reproducing light beam, and applying a reproducing magnetic field locally to this region to transfer a recording magnetic domain to the reproducing layer, from which information can be reproduced. Therefore, in comparison with the conventional reproducing method, which includes applying a magnetic field to a region wider than a light spot, it is possible to remarkably improve the reproducing resolution. Because the high temperature region is formed outside the light spot, it is also possible to improve the information readout speed by increasing the linear velocity of the recording medium.

A recording/reproducing apparatus according to the invention can form a high temperature region of a heat spot outside the associated light spot by means of a rotating driver for rotating a magneto-optical recording medium while controlling the rotational speed of the medium, and/or a high NA lens which can form a minute light spot on a magneto-optical recording medium. This apparatus also includes a lens and a magnetic field source, which are so positioned that a magnetic field can be applied to a high temperature region formed outside a light spot. By using a magnetic field source including a magnetic field applicator which is narrow in the direction along the track of the recording medium, it is possible to form an extremely minute recording magnetic domain in a high temperature region formed in the recording layer of the medium. This field source can apply a reproducing magnetic field locally to a high temperature region positioned outside a light spot on the reproducing layer of the recording medium. This improves the reproducing resolution which depends on the region to which the magnetic field is applied. It is consequently possible to reliably reproduce information recorded in an extra-high-density fashion. Therefore, the recording/reproducing apparatus is very suitable for extra-high-density recording.

A magneto-optical head according to the invention includes a magnetic head having a magnetic field generator positioned off the optical axis of a lens. The field generator can be positioned in a high temperature region of a heat spot which is produced outside a light spot formed on a magneto-optical recording medium. This makes it possible to apply a magnetic field locally to the high temperature region. Therefore, the magneto-optical head is very suitable for the recording method and the reproducing method according to the invention.

What is claimed is:

1. A recording method for recording information on a magneto-optical recording medium by applying a magnetic field to a heat spot heated by a light spot, the method comprising:

moving the light spot relative to the recording medium in such a manner that a high temperature region of the heat spot is formed outside the light spot; and applying a magnetic field to the high temperature region of the heat spot.

2. The recording method defined in claim 1, wherein the center of the magnetic field is coaxial with the center of the high temperature region of the heat spot.

3. The recording method defined in claim 1, wherein the magnetic field is applied to the magneto-optical recording medium by a magnetic field source including a magnetic field generator which has a narrower width in the direction along the track of the medium than the light spot.

4. The recording method defined in claim 3, wherein part of the magnetic field source is positioned inside the light spot, and that the rate of decrease in efficiency for light utilization due to the position of the magnetic field sources is 50% or lower.

5. The recording method defined in claim 3, further comprising the steps of:

rotating the magneto-optical recording medium;

calculating a linear velocity from the rotational speed of the recording medium and a position of the magnetic field source over the medium; and adjusting, on the basis of the calculated linear velocity, the distance between the center of the light spot and the region to which the magnetic field is applied.

6. The recording method defined in claim 1, wherein the magneto-optical recording medium includes a magnetic domain-enlarging/reproducing layer.

7. A recording method for recording information on a magneto-optical recording medium by applying a magnetic field to a heat spot heated by a light spot, the method comprising the steps of:

moving the light spot relative to the recording medium in such a manner that a high temperature region of the heat spot is formed off a center of the light spot in the direction along the track of the medium; and applying a magnetic field to the inside of the high temperature region of the heat spot.

8. A reproducing method for a magneto-optical recording medium including a recording layer and a reproducing layer, the method comprising the steps of:

moving a light spot relative to the recording medium in such a manner that a high temperature region of a heat spot is formed outside the light spot on the reproducing layer; and applying a magnetic field to the high temperature region of the heat spot to transfer a magnetic domain of the recording layer to the reproducing layer.

9. The reproducing method defined in claim 8, wherein the center of the magnetic field is coaxial with the center of the high temperature region of the heat spot.

10. The reproducing method defined in claim 8, wherein a magnetic field is applied in such a manner that the region to which the magnetic field is applied in the magneto-optical recording medium is shorter in the direction along the track of the medium than the diameter of the light spot.

11. The reproducing method defined in claim 8, wherein the magnetic field is applied to the magneto-optical recording medium by a magnetic head including a magnetic field generator which has a narrower width in the direction along the track of the medium than the light spot.

12. The reproducing method defined in claim 8, wherein the method further comprising the steps of:

rotating the magneto-optical recording medium; and adjusting, on the basis of a linear velocity of the recording medium, a distance between the center of the light spot and the region to which the magnetic field is applied.

13. The reproducing method defined in claim 8, wherein the reproducing layer is a magnetic domain-enlarging/reproducing layer in which a magnetic domain is enlarged by applying the magnetic field thereto.

14. A reproducing method for a magneto-optical recording medium including a recording layer and a reproducing layer, the method comprising the steps of:

moving a light spot relative to the recording medium in such a manner that a high temperature region of a heat spot is formed off the center of the light spot on the reproducing layer; and applying a magnetic field to the inside of the high temperature region of the heat spot to transfer a magnetic domain of the recording layer to the reproducing layer.

15. A recording/reproducing apparatus for a magneto-optical recording medium, comprising:

light source for irradiating the recording medium with a light beam;

a lens for condensing the light beam from the light source to form a light spot on the recording medium;

a magnetic field source for applying a magnetic field to the recording medium; and a device which moves the light spot and the recording medium relative to each other in such a manner that a high temperature region of a heat spot produced on the basis of the heat intensity distribution of the light spot is formed outside the light spot;

the field source and the lens being so positioned that the magnetic field is applied to the high temperature region.

16. The recording/reproducing apparatus defined in claim 15, further comprising:

a rotating driver which rotates the magneto-optical recording medium; and a controller which calculates a linear velocity from a rotational speed of the recording medium and a position of the magnetic field source over the medium, and controls on the basis of the calculated linear velocity, a distance between a center of the light spot and the region to which the magnetic field is applied.

17. The recording/reproducing apparatus defined in claim 15, wherein a center of the magnetic field generating section of the magnetic field source and the center of the high temperature region of the heat spot are substantially coaxial.

18. The recording/reproducing apparatus defined in claim 15, wherein the magnetic field generating section of the magnetic field source has a narrower width in the direction along the track of the recording medium than the light spot.

19. The recording/reproducing apparatus defined in claim 15, wherein the lens is a solid immersion lens.

20. A magneto-optical head for recording information on and/or reproducing information from a magneto-optical recording medium, comprising:

a lens for condensing a light beam onto the recording medium; and a magnetic field source for applying a magnetic field to the recording medium, the field source having a narrower width in the direction along the track of the medium than a diameter of a light spot formed on the medium by the lens;

the magnetic field source being formed at the bottom of the lens in such a manner that a central axis of the magnetic field generated from the source is off the axis of the lens.

21. The magneto-optical head defined in claim 20, wherein the magnetic field source is provided on a substrate which is formed in close contact with the lens.

22. The magneto-optical head defined in claim 21, wherein a difference in refractive index between the substrate and the lens falls within a range of ±10% of whichever refractive index is higher.

23. The magneto-optical head defined in claim 20, wherein the lens is a solid immersion lens.

24. The magneto-optical head defined in claim 20, wherein the magnetic field source is a thin magnetic head which formed by a lithographic process.

25. The magneto-optical head defined in claim 20, wherein the head further comprising a suspended slider on which the lens and the magnetic field source are mounted.

26. The magneto-optical head defined in claim 20, further comprising a controller for controlling, on the basis of a linear velocity of the magneto-optical recording medium, a distance between the center of the light spot formed on the medium by the lens and the center of the magnetic field generated from the magnetic field source.

* * * * *